US012640285B2

(12) United States Patent
Kim et al.

(10) Patent No.: US 12,640,285 B2
(45) Date of Patent: May 26, 2026

(54) HIGHLY FLAME-RETARDANT UTP CABLE

(71) Applicant: LS CABLE & SYSTEM LTD., Anyang-si (KR)

(72) Inventors: In Ha Kim, Seocho-gu (KR); Yu Min Kim, Gwangmyeong-si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 210 days.

(21) Appl. No.: 18/702,166

(22) PCT Filed: Feb. 15, 2022

(86) PCT No.: PCT/KR2022/002199
§ 371 (c)(1),
(2) Date: Apr. 17, 2024

(87) PCT Pub. No.: WO2023/090538
PCT Pub. Date: May 25, 2023

(65) Prior Publication Data
US 2025/0014779 A1      Jan. 9, 2025

(30) Foreign Application Priority Data

Nov. 16, 2021    (KR) ........................ 10-2021-0157331

(51) Int. Cl.
*H01B 7/29*         (2006.01)
*C08F 8/20*         (2006.01)
(Continued)

(52) U.S. Cl.
CPC .............. *H01B 7/295* (2013.01); *C08F 8/20* (2013.01); *C08K 3/22* (2013.01); *H01B 3/445* (2013.01)

(58) Field of Classification Search
CPC . H01B 7/04; H01B 7/009; H01B 7/18; H01B 7/182; H01B 7/1805; H01B 7/28;
(Continued)

(56) References Cited

U.S. PATENT DOCUMENTS

| | | | | |
|---|---|---|---|---|
| 8,426,732 B1 * | 4/2013 | Waldner | ................. | H01B 11/06 174/113 C |
| 9,424,963 B1 * | 8/2016 | McNutt | .................. | H01B 11/02 |

(Continued)

FOREIGN PATENT DOCUMENTS

| | | |
|---|---|---|
| JP | S58140912 | 8/1983 |
| JP | H07312120 A | 11/1995 |

(Continued)

OTHER PUBLICATIONS

Office Action for related Korean Application No. 10-2021-0157331; action dated Nov. 20, 2025; (5 pages).
(Continued)

*Primary Examiner* — William H. Mayo, III
(74) *Attorney, Agent, or Firm* — K&L Gates LLP

(57) ABSTRACT

A highly flame-retardant UTP cable may have a plurality of pair units formed by a plurality of conductive wires twisted together, wherein each conductive wire includes a conductor, an insulator surrounding the conductor, an outer jacket surrounding the plurality of pair units, and a separator including one or more partition walls disposed between the plurality of pair units, wherein any cross-section of the cable has a cross-sectional limited oxygen index, of 57% or more.

10 Claims, 1 Drawing Sheet

░ Flouropolymer
░ Flame-retardant polyolefin resin composition
░ Kevlar aramid yard, fiber class epoxy rod, fiber reinforced polyethylene (FRP), high strength fiber, galvanized steel wire, steel wire
░ Resin composition including flame retardant PVC

(51) Int. Cl.
    *C08K 3/22*         (2006.01)
    *H01B 3/44*         (2006.01)
    *H01B 7/295*       (2006.01)

(58) Field of Classification Search
    CPC .......... H01B 7/282; H01B 7/29; H01B 7/295;
               H01B 9/02; H01B 9/028; H01B 11/02;
               H01B 11/04; H01B 11/08; H01B 13/02;
                                          C08K 3/22
    USPC .......... 174/110 R, 113 R, 113 C, 115, 116 R,
               174/120 R, 120 C, 121 R, 121 SR;
                                    428/377
    See application file for complete search history.

(56)                References Cited

U.S. PATENT DOCUMENTS

| | | | | |
|---|---|---|---|---|
| 10,068,685 | B1 * | 9/2018 | Cook ..................... | H01B 11/08 |
| 10,867,724 | B1 * | 12/2020 | Lanoe ..................... | H01B 13/02 |
| 2003/0132021 | A1 * | 7/2003 | Gareis ..................... | H01B 11/04 |
| | | | | 174/113 C |
| 2004/0216914 | A1 * | 11/2004 | Vexler ..................... | H01B 3/441 |
| | | | | 174/138 C |
| 2005/0092515 | A1 * | 5/2005 | Kenny ................... | H01B 11/08 |
| | | | | 174/113 C |
| 2011/0220394 | A1 * | 9/2011 | Szylakowski .......... | H01B 7/295 |
| | | | | 174/137 B |
| 2020/0357539 | A1 * | 11/2020 | Lee ........................ | H01B 11/08 |

FOREIGN PATENT DOCUMENTS

| | | | | | |
|---|---|---|---|---|---|
| JP | 2018078045 | A | | 5/2018 | |
| KR | 1020000047604 | A | | 7/2000 | |
| KR | 2020090011197 | | | 11/2009 | |
| KR | 2015074557 | A | * | 7/2015 | ............ H01B 3/307 |
| KR | 1020150074557 | A | | 7/2015 | |
| KR | 20160088497 | A | | 7/2016 | |
| KR | 101731279 | B1 | | 4/2017 | |
| KR | 101936806 | B1 | | 1/2019 | |
| KR | 102206643 | B1 | * | 1/2021 | .............. H01B 7/29 |
| KR | 1020210050043 | A | | 5/2021 | |

OTHER PUBLICATIONS

International Search Report for related International Application No. PCT/KR2022/002199; action dated May 25, 2023; (2 pages).
Written Opinion for related International Application No. PCT/KR2022/002199; action dated May 25, 2023; (3 pages).

* cited by examiner

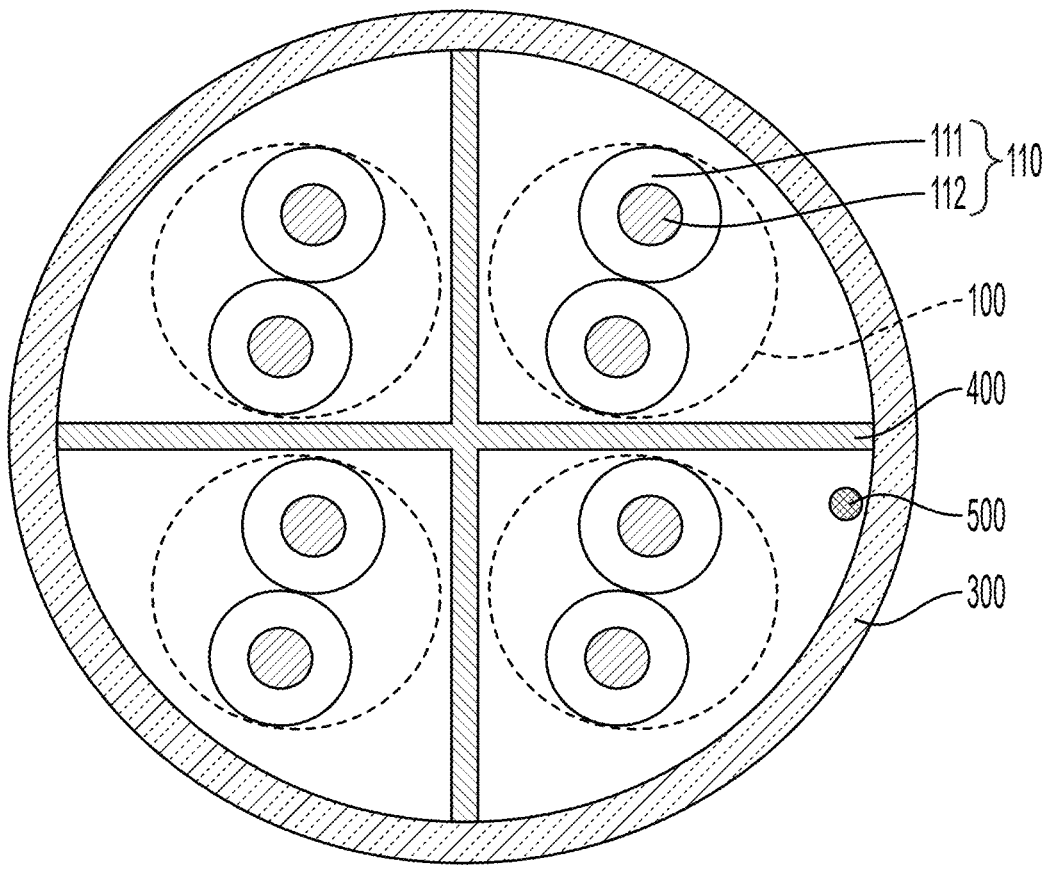
| | Flouropolymer |
| | Flame-retardant polyolefin resin composition |
| | Kevlar aramid yard, fiber class epoxy rod, fiber reinforced polyethylene (FRP), high strength fiber, galvanized steel wire, steel wire |
| | Resin composition including flame retardant PVC |

HIGHLY FLAME-RETARDANT UTP CABLE

CROSS-REFERENCE TO RELATED APPLICATIONS

The present application is a National Stage of International Application No. PCT/KR2022/002199 filed on Feb. 15, 2022, which claims the benefit of Korean Patent Application No. 10-2021-0157331, filed on Nov. 16, 2021, with the Korean Intellectual Property Office, the entire contents of each hereby incorporated by reference.

FIELD

The present disclosure relates to a category 6 (C6) unshielded twisted pair (UTP) cable satisfying plenum-rated high flame retardancy. Specifically, the present disclosure relates to a highly flame-retardant UTP cable that satisfies the plenum-rated highly flame-retardant characteristics of NFPA 262 standard, while implementing the electrical characteristics required in C6 UTP cables, and for which manufacturing costs can be greatly reduced.

BACKGROUND

An unshielded twisted pair (UTP) cable is a type of signal wire that connects a regular telephone line or the environment of a local area network (LAN), so named for being a wire with a plastic jacket surrounded around the outside of a plurality of pair units made of two insulated copper wires twisted together.

Conventional UTP cables are structured with a plurality of pair units surrounded by a single outer jacket. Here, each pair unit is formed by twisting two conductive wires of conductive metallic wire, preferably annealed copper wire coated to be insulated with an insulator, with each other at a predetermined pitch.

In addition, a separator having a plurality of partition walls disposed between each of the plurality of pair units to maintain the disposition of the plurality of pair units, a ripcord to facilitate removal of the outer jacket, and the like may be further included inside the outer jacket.

In the case of the plenum-rated Category 6 (C6) UTP cable, a flame-retardant test in accordance with NFPA 262 is performed to determine whether the cable passes or fails according to flame propagation length and the amount of smoke generated. In this case, since NFPA 262 is the highest flame-retardant standard for UTP cables for telecommunications and simultaneously regulates the amount of smoke generated, materials that are capable of being implemented with high flame-retardant and low smoke characteristics are used as polymer compound materials such as an insulator, a separator, and an outer jacket.

In particular, it has been common to use fluorinated resins such as polytetrafluoroetylene (PTFE) resin and fluorinated ethylene propylene (FEP) resin as the insulator and separator, but there is a problem that the price of the product is high due to the use of expensive fluorinated resins, and when flame retardant materials other than fluorinated resins are applied to reduce the price, the electrical characteristics required in UTP cables may be significantly degraded.

Therefore, there is an acute need for a highly flame-retardant C6 UTP cable that satisfies the plenum-rated highly flame-retardant characteristics of the NFPA 262 standard, while implementing the electrical characteristics required in UTP cables, and for which manufacturing costs can be reduced.

SUMMARY

The present disclosure is directed to providing a highly flame-retardant C6 UTP cable that satisfies the plenum-rated highly flame-retardant characteristics of NFPA 262 standard.

In addition, the present disclosure is directed to providing a highly flame-retardant UTP cable in which the electrical characteristics required in UTP cables are implemented and manufacturing costs can be reduced.

To achieve the objects, the present disclosure is directed to providing:

a highly flame-retardant UTP cable, the cable may include a plurality of pair units formed by a plurality of conductive wires twisted together, each including a conductor and an insulator surrounding the conductor, an outer jacket surrounding the plurality of pair units, and a separator including one or more partition walls disposed between the plurality of pair units, in which any cross-section of the cable has a cross-sectional limited oxygen index, as defined by Equation 1 below, of 57% or more.

$$\text{Cross-sectional limited oxygen index } (\%) = a/(a+b+c) \times \alpha + a/(a+b+c) \times \beta + a/(a+b+c) \times \gamma \qquad \text{[Equation 1]}$$

In Equation 1 above, a is a cross-sectional area (mm$^2$) of an insulator, b is a cross-sectional area (mm$^2$) of a separator, c is a cross-sectional area (mm$^2$) of an outer jacket, α is a limited oxygen index (LOI) of a material that forms the insulator, β is a limited oxygen index (LOI) of a material that forms the separator, γ is a limited oxygen index (LOI) of a material that forms the outer jacket.

Here, the highly flame-retardant UTP cable of claim 1 may have a maximum combustion length of 1.52 m or less, a maximum smoke density of 0.5 or less, and an average smoke density of 0.15 or less as measured by a plenum flame-retardant test for which certification is given by UL based on NFPA 262 standard.

In addition, the cross-sectional limited oxygen index as defined by Equation 1 may be 57 to 68%.

Further, the insulator may include a fluoropolymer having a limited oxygen index (LOI) of 90% or more.

Here, the insulator may include a fluorinated ethylene propylene (FEP) resin.

Meanwhile, the separator may be formed from a flame-retardant polyolefin resin composition having a limited oxygen index (LOI) of 38 to 45%.

Here, the flame-retardant polyolefin resin composition may include a polyolefin resin and a thermoplastic polyolefin elastomer resin as a base resin, and include a metal hydroxide as a flame retardant.

In addition, the content of the flame-retardant may be 200 to 270 parts by weight, based on 100 parts by weight of the base resin.

Further, the outer jacket may be formed from a flame-retardant polyvinyl chloride (PVC) resin composition having a limited oxygen index (LOI) of 44 to 57%.

Meanwhile, the highly flame-retardant UTP cable further may include a ripcord inside the outer jacket to facilitate removal of the outer jacket.

The highly flame-retardant UTP cable according to the present disclosure can reduce the manufacturing cost of the cable by applying a flame-retardant polyolefin resin as the material of the separator, which has a relatively small effect on the electrical characteristics of the cable, while exhibiting an excellent effect that sufficient electrical characteristics of the cable can be implemented by using a fluoropolymer-based material for the insulator, which has a relatively large effect on the electrical characteristics of the cable, and precisely controlling the limited oxygen index (LOI) in the cross-sectional area of the cable.

BRIEF DESCRIPTION OF THE DRAWINGS

FIG. 1 schematically illustrates a cross-sectional structure of a four-pair UTP cable having four pair units surrounded with an outer jacket according to the present disclosure.

DETAILED DESCRIPTION

Hereinafter, exemplary embodiments of the present disclosure will be described in detail with reference to the accompanying drawings. However, the present disclosure is not limited to the exemplary embodiments described below and may be specified as other aspects. On the contrary, the embodiments introduced herein are provided to make the disclosed content thorough and complete, and sufficiently transfer the spirit of the present disclosure to those skilled in the art. Like reference numerals indicate like constituent elements throughout the specification.

As illustrated in FIG. 1, a plenum-rated highly flame-retardant Category 6 (C6) UTP cable according to the present disclosure may include a plurality of pair units 100 formed in a manner in which a plurality of conductive wires 110, preferably two wires, each being formed by a conductive metal wire 111 being insulatingly coated with an insulator 112, are twisted together at a predetermined pitch, an outer jacket 300 surrounding the plurality of pair units 100, a separator 400 including one or more partition walls disposed between the plurality of pair units 100 to maintain the disposition of the plurality of pair units 100 inside the outer jacket 300, a ripcord 500 that facilitates removal of the outer jacket 300, and the like.

The inventors of the present disclosure have completed the present disclosure by experimentally verifying that the plenum-rated highly flame-retardant characteristics of the highly flame-retardant UTP cable according to the present disclosure can be satisfied when the cross-sectional limited oxygen index defined by Equation 1 below is controlled to 57% or more, for example, 57 to 68%, while the electrical characteristics required in Category 6 (C6) UTP cables can be implemented and manufacturing costs can be minimized.

$$\text{Cross-sectional limited oxygen index } (\%) = a/(a+b+c) \times \alpha + a/(a+b+c) \times \beta + a/(a+b+c) \times \gamma \qquad \text{[Equation 1]}$$

In Equation 1 above,
a is a cross-sectional area (mm$^2$) of an insulator,
b is a cross-sectional area (mm$^2$) of a separator,
c is a cross-sectional area (mm$^2$) of an outer jacket,
$\alpha$ is a limited oxygen index (LOI) of a material that forms the insulator,
$\beta$ is a limited oxygen index (LOI) of a material that forms the separator, and
$\gamma$ is a limited oxygen index (LOI) of a material that forms the outer jacket.

Here, the Category 6 (C6) plenum-rated highly flame-retardant characteristics may not be satisfied when the cross-sectional limited oxygen index defined by Equation 1 above is less than 57%. In contrast, the manufacturing cost of the UTP cable may unnecessarily increase when the cross-sectional limited oxygen index is greater than 68%.

The specifications and material of the conductive metal wire 111 adheres to the international standard for UTP cables (ANSI/TIA/EIA 568A). For example, the conductive metal wire 111 may be made of, for example, copper, annealed copper, tinned copper, and the like, and may be a solid wire or a stranded wire, preferably a stranded wire to improve the flexibility of the UTP cable. In addition, when the conductive metal wire 111 is a solid wire, the conductive metal wire 111 may have an outer diameter of about 0.5 to 0.6 mm, and when the conductive metal wire 111 is a stranded wire, each element wire thereof may have a diameter of about 0.203 mm.

Since the plurality of pair units 100 are disposed adjacent to each other inside the outer jacket 300, the electromagnetic field formed by the current flowing in each pair unit 100 may cause the transmission signals of the adjacent pair units 100 to be adversely affected, that is, a crosstalk phenomenon may occur, and each pair unit 100 has a structure in which the plurality of conductive wires 110 are twisted at a predetermined pitch to suppress or minimize such crosstalk phenomenon.

The insulator 112 of the plurality of pair units 100 may include a fluoropolymer, preferably a fluoropolymer having a limited oxygen index (LOI) of 90% or more, for example, of 90 to 99% such as polytetrafluoroethylene resin (PTFE), perfluoroalkoxy resin (PFA), fluorinated ethylene propylene resin (FEP), and preferably fluorinated ethylene propylene resin (FEP).

Here, there is a problem that when the limited oxygen index (LOI) of the fluoropolymer included in the insulator 112 is less than 90%, the flame retardancy of the cable is greatly reduced, in contrast, when the LOI is greater than 99%, the manufacturing cost of the cable unnecessarily increases.

Meanwhile, the separator 400 may be formed from a flame-retardant polyolefin resin composition, in which the flame-retardant polyolefin resin composition includes, for example, a base resin and a flame retardant, and may further include other additives such as an antioxidant, an activator, a processing aid, and the like. The base resin may include, for example, 50 to 90 parts by weight of a polyolefin resin and 10 to 50 parts by weight of a thermoplastic polyolefin elastomer resin, based on a total of 100 parts by weight. In addition, the base resin may further include 2 to 10 parts by weight of a reactive polyolefin with polar groups introduced to provide compatibility between the base resin and the flame retardant.

The polyolefin resin may be a homopolymer or a random or block copolymer, preferably a block copolymer in consideration of cold resistance, mechanical characteristics and the like, and may be, for example, a low density polyethylene resin. When the content of the polyolefin resin is less than 50 parts by weight, the hardness of the separator 400 may be reduced, resulting in crushing, reduced scratch resistance, and a rough appearance at high speed extrusion. In contrast, when the content is greater than 90 parts by weight, elongation and flexibility may be reduced. The polyolefin resin may preferably have a melting flow rate (MFR) of 3 to 15 (2.16 kg at 230° C.).

The thermoplastic polyolefin elastomer resin may be, for example, a thermoplastic elastomer including a copolymer of ethylene and another $\alpha$-olefin, for example, an ethylene propylene copolymer, or a styrene-ethylene-butylene-styrene copolymer, and the like, and in consideration of the electrical characteristics and the like, a thermoplastic elastomer including an ethylene-$\alpha$-olefin copolymer is preferred. In addition, the reactive polyolefin into which the polar groups are introduced is preferably polyethylene grafted with maleic anhydride, glycidyl methacrylate, and the like. The thermoplastic polyolefin elastomer resin may preferably have an MFR (2.16 kg at 230° C.) of 3 to 15.

The flame retardant may be added in an amount from 200 to 270 parts by weight, based on 100 parts by weight of the base resin. The flame retardant may be a metal hydroxide, for example, magnesium hydroxide, aluminum hydroxide, and the like, and may not be surface treated or may be surface treated by silane, stearic acid, and the like. When the content of the flame retardant is less than 200 parts by weight, the flame retardancy may be insufficient. In contrast, when the content is more than 270 parts by weight, the processability and electrical characteristics may be degraded.

The flame retardant polyolefin resin composition preferably has a dielectric constant (@1 MHz) of 2.9 or less, a limited oxygen index (LOI) of 38 to 45%, and a smoke density (ASTM E662, Flaming mode, Dm) of 500 or less, and exhibits sufficient electrical properties, mechanical properties, flame retardancy, flame resistance, and the like by the above composition and properties. Here, when the

6

(LOI) of 44 to 57%. The flame retardant grade of flame retardant polyvinyl chloride (PVC) with a limited oxygen index (LOI) greater than 57% is very expensive, which causes the problem of driving up the unit cost of UTP cable excessively. Here, when the limited oxygen index (LOI) of the flame-retardant polyvinyl chloride (PVC) is less than 44%, the flame retardancy of the cable is reduced. In contrast, when the LOI is more than 57%, the cost of the cable unnecessarily increases.

The ripcord 500 serves to facilitate removal of the outer jacket 300, and may also function as a tensile line to provide a tensile force to the UTP cable when the ripcord 500 is made of a material such as Kevlar aramid yarn, fiber glass epoxy rod, fiber reinforced polyethylene (FRP), high strength fiber, galvanized steel wire, steel wire, and the like.

EXAMPLES

1. Manufacturing Example

UTP cable specimens were manufactured with the materials and configurations of the insulator, separator, and outer jacket listed in Table 1 below.

TABLE 1

| | | Example | | | | Comparative Example | | | | |
|---|---|---|---|---|---|---|---|---|---|---|
| | | 1 | 2 | 3 | 4 | 1 | 2 | 3 | 4 | 5 |
| Separator | Limited Oxygen Index (LOI) (%) | 40 | 40 | 40 | 40 | 40 | 35 | 40 | 35 | 18 |
| | Height (mm) | 4.2 | 3.75 | 3.75 | 3.75 | 3.75 | 3.75 | 3.75 | 3.75 | 3.75 |
| | Thickness (mm) | 0.4 | 0.48 | 0.48 | 0.48 | 0.48 | 0.48 | 0.48 | 0.48 | 0.48 |
| | Cross-sectional area (mm$^2$) | 3.20 | 3.37 | 3.37 | 3.37 | 3.37 | 3.37 | 3.37 | 3.37 | 3.37 |
| Outer Jacket | Limited Oxygen Index (LOI) (%) | 46 | 46 | 46 | 55 | 46 | 46 | 42 | 42 | 55 |
| | Thickness (mm) | 0.325 | 0.325 | 0.350 | 0.350 | 0.500 | 0.350 | 0.350 | 0.350 | 0.350 |
| | Cross-sectional area (mm$^2$) | 5.539 | 5.539 | 5.993 | 5.993 | 8.796 | 5.993 | 5.993 | 5.993 | 5.993 |
| Insulator | Limited Oxygen Index (LOI) (%) | 95 | 95 | 95 | 95 | 95 | 95 | 95 | 95 | 95 |
| | Cross-sectional area (mm$^2$) | 3.441 | 3.441 | 3.441 | 3.441 | 3.441 | 3.441 | 3.441 | 3.441 | 3.441 |
| Cross-sectional limited oxygen index (%) | | 58.27 | 58.02 | 57.59 | 61.80 | 55.51 | 56.27 | 55.72 | 54.40 | 56.01 | limited oxygen index (LOI) of the flame-retardant polyolefin resin composition is less than 38%, the flame-retardant characteristics of the cable are significantly degraded. In contrast, when the LOI is greater than 45%, the processability of the separator 400 may be degraded and the electrical characteristics of the cable may be degraded.

Meanwhile, the other additives may be included in an amount of 5 to 15 parts by weight, based on 100 parts by weight of the base resin.

The outer jacket 300 may preferably be made of a resin composition that includes flame retardant polyvinyl chloride (PVC). Preferably, the flame retardancy of the flame retardant polyvinyl chloride (PVC) has a limited oxygen index

2. Evaluation of Flame Retardancy

A flame from a burner mounted at a 90° angle to a horizontally fixed sample is applied for 20 minutes in the lengthwise direction of the cable, as in the plenum flame retardant test for which certification is given by UL based on NFPA 262 standard, and the length of the cable flame propagation and the amount of smoke generated during combustion were measured on each UTP cable specimen (7.32 m long) of Comparative Examples and Examples. The results are passed when the maximum combustion length is 1.52 m or less, the maximum smoke density is 0.5 or less, and the average smoke density is 0.15 or less. The evaluation results are shown in Table 2 below.

TABLE 2

| | Example | | | | Comparative Example | | | | |
| --- | --- | --- | --- | --- | --- | --- | --- | --- | --- |
| | 1 | 2 | 3 | 4 | 1 | 2 | 3 | 4 | 5 |
| Maximum combustion length (m) | 3.5 | 4.0 | 3.5 | 3.0 | 4.5 | 6.5 | 7.5 | 6.5 | 6.0 |
| Maximum Smoke Density | 0.39 | 0.42 | 10.45 | 0.49 | 0.79 | 0.58 | 0.66 | 0.96 | 0.84 |
| Average Smoke Density | 0.10 | 0.10 | 0.11 | 0.11 | 0.15 | 0.13 | 0.12 | 0.16 | 0.14 |

As described in Tables 1 and 2 above, it was confirmed that the UTP cables of Examples 1 to 4 according to the present disclosure, having a cross-sectional limited oxygen index defined by Equation 1 of 57% or more, are satisfied with the C6 plenum-rated highly flame-retardant characteristics based on NFPA 262 standard. In contrast, the UTP cables of Comparative Examples 1 to 5, having a cross-sectional limited oxygen index of less than 57%, are not satisfied with the C6 plenum-rated highly flame-retardant characteristics based on NFPA 262 standard due to insufficient flame retardancy or flame suppression.

While the present disclosure has been described above with reference to the exemplary embodiments, it may be understood by those skilled in the art that the present disclosure may be variously modified and changed without departing from the spirit and scope of the present disclosure disclosed in the claims. Therefore, it should be understood that any modified embodiment that essentially includes the constituent elements of the claims of the present disclosure is included in the technical scope of the present disclosure.

The invention claimed is:

1. A highly flame-retardant UTP cable comprising:
a plurality of pair units formed by a plurality of conductive wires twisted together, each including a conductor and an insulator surrounding the conductor;
an outer jacket surrounding the plurality of pair units; and
a separator including one or more partition walls disposed between the plurality of pair units,
wherein any cross-section of the cable has a cross-sectional limited oxygen index, as defined by Equation 1 below, of 57% or more, $$\text{Cross-sectional limited oxygen index } (\%)=a/(a+b+c)\times\alpha+a/(a+b+c)\times\beta+a/(a+b+c)\times\gamma \qquad \text{[Equation 1]}$$

In Equation 1 above,
a is a cross-sectional area (mm') of an insulator,
b is a cross-sectional area (mm') of a separator,
c is a cross-sectional area (mm') of an outer jacket,
α is a limited oxygen index (LOI) of a material that forms the insulator, β is a limited oxygen index (LOI) of a material that forms the separator, and
γ is a limited oxygen index (LOI) of a material that forms the outer jacket.

2. The highly flame-retardant UTP cable of claim 1, wherein the cable has a maximum combustion length of 1.52 m or less, a maximum smoke density of 0.5 or less, and an average smoke density of 0.15 or less as measured by a plenum flame-retardant test for which certification is given by UL based on NFPA 262 standard.

3. The highly flame-retardant UTP cable of claim 1, wherein the cross-sectional limited oxygen index as defined by Equation 1 is 57 to 68%.

4. The highly flame-retardant UTP cable of claim 1, wherein the insulator includes a fluoropolymer having a limited oxygen index (LOI) of 90% or more.

5. The highly flame-retardant UTP cable of claim 4, wherein the insulator includes a fluorinated ethylene propylene (FEP) resin.

6. The highly flame-retardant UTP cable of claim 1, wherein the separator is formed from a flame-retardant polyolefin resin composition having a limited oxygen index (LOI) of 38 to 45%.

7. The highly flame-retardant UTP cable of claim 6, wherein the flame-retardant polyolefin resin composition includes a polyolefin resin and a thermoplastic polyolefin elastomer resin as a base resin, and includes a metal hydroxide as a flame retardant.

8. The highly flame-retardant UTP cable of claim 7, wherein the content of the flame-retardant is 200 to 270 parts by weight, based on 100 parts by weight of the base resin.

9. The highly flame-retardant UTP cable of claim 1, wherein the outer jacket is formed from a flame-retardant polyvinyl chloride (PVC) resin composition having a limited oxygen index (LOI) of 44 to 57%.

10. The highly flame-retardant UTP cable of claim 1, further comprising:
a ripcord inside the outer jacket to facilitate removal of the outer jacket.

\* \* \* \* \*